May 31, 1949.   C. H. GIBBONS   2,472,045
FLUID PRESSURE MEASURING DEVICE
Filed Dec. 12, 1945

INVENTOR
Chester H. Gibbons
BY
ATTORNEY

Patented May 31, 1949

2,472,045

UNITED STATES PATENT OFFICE 2,472,045

FLUID PRESSURE MEASURING DEVICE

Chester H. Gibbons, Drexel Hill, Pa., assignor to The Baldwin Locomotive Works, a corporation of Pennsylvania Application December 12, 1945, Serial No. 634,422

5 Claims. (Cl. 201—63)

This invention relates generally to fluid pressure measuring devices and particularly to engine cylinder pressure indicators.

While the invention is particularly adapted for determining engine cylinder pressures wherein explosion pressures are accompanied by relatively high temperatures, yet the invention is equally applicable to other fluid pressure measuring applications.

The present device is especially arranged to employ electrical impedance strain gages preferably of the resistance wire type in which the wire filament is bonded throughout its effective length to a member subject to strain. While various fluid pressure measuring devices of this general type have been proposed, yet they have been deficient in certain structural and functional aspects particularly as to being able to cope with extremely high temperatures which materially interfere not only with proper temperature compensation but also with maintaining an adequate bonding action of the bonding agent for the wire filament.

It is an object of my invention to provide an improved fluid pressure measuring device that can be effectively used for measuring pressures at high temperatures combined with a high degree of sensitivity, accuracy and ruggedness.

Another object is to provide an improved fluid pressure measuring device employing strain sensitive means which can be preloaded in a relatively simple and effective manner so that the fluid pressure measurements are of a high degree of accuracy, especially during low pressures.

A further object is to provide an improved fluid pressure measuring device that is relatively economical in construction, operation and maintenance, that is compact and readily assembled or disassembled for purposes of manufacture, inspection or repair, and is adapted to fully protect the bonded wire gages from the fluids whose pressures are being measured regardless of whether the fluids are either liquids or high temperature explosion gases as in internal combustion engine cylinders.

Other objects and advantages will be more apparent to those skilled in the art from the following description of the accompanying drawing in which.

Figure 1:
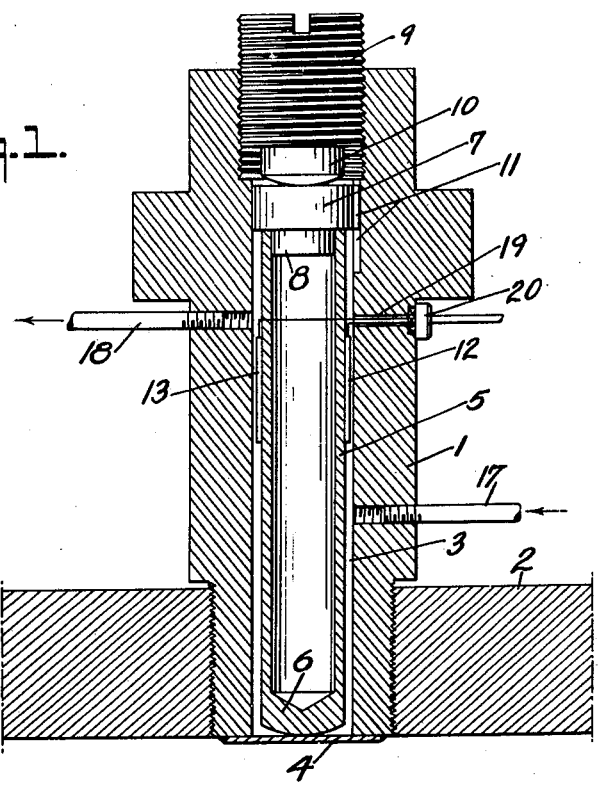
Fig. 1 is a sectional view of the preferred form of my fluid pressure measuring device.
Figure 2:
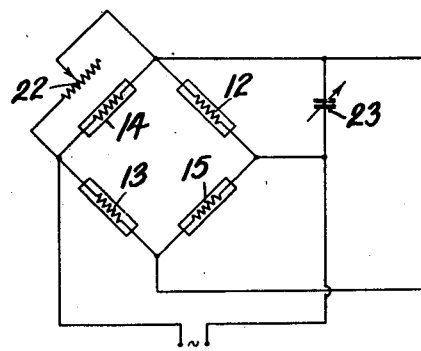
Fig. 2 is a wiring and instrumentation diagram used in association with the strain gages.

In the particular embodiments of the invention disclosed herein I have provided, as shown in Fig. 1, a plug 1 that is normally screwed into a suitable threaded opening of a fluid pressure vessel wall 2, such as the cylinder of an internal combustion engine or other fluid or liquid container. The plug 1 has a bore 3 which is closed and hermetically sealed at its lower end by a movable closure element, preferably a relatively thin diaphragm 4 welded, brazed or otherwise suitably secured around its edge to the bottom of plug 1. The diaphragm 4 is exposed to the fluid pressure to be measured and has engagement with the lower, preferably semi-spherical, end of a cylindrical strain responsive element 5 which is preferably hollow to provide an increased intensity of strain in its walls in response to a given force acting on the lower closed end 6 of element 5. This element is maintained in a substantially axial position within bore 3 and in spaced relation to the walls thereof by being seated on a centering plug 7 having a short extension 8 extending internally of the hollow element 5. If desired, these may be soldered together. To impose any desired preload on the strain element 5 an adjustable screw plug 9 is threaded in the upper end of plug 1 and provided with an extension 10 bearing upon the upper centering plug 7 which is normally slidable within the bore 3. Adjustment of screw 9 increases the initial strain in element 5 which is prevented from rotating by a key and keyway 11 formed on centering plug 7 and in the wall of bore 3. In this manner the rotative effect of screw 9 will not be transmitted to element 5, thereby avoiding or reducing to a minimum the possibility of extraneous forces or strains, such as torsional strains, being introduced into the strain sensitive element 5.

From the foregoing it is seen that variations in pressure acting on diaphragm 4 will be transmitted to strain sensitive element 5. The strain therein is picked up by bonded wire type strain gages generally indicated at 12, 13, 14 and 15, these gages being of the general type disclosed in Simmons Patent No. 2,292,549 and which may be arranged so that the wire filament extends vertically in certain of the gages and transversely in other gages for temperature compensating purposes. The gages which extend vertically, i. e. axially of element 5, may be disposed on diametric opposite sides thereof to eliminate any possible bending effects therein. The gages are bonded to the external surface of element 5 and these are maintained at a safe temperature by circulating any suitable gaseous or liquid coolant through a pipe 17 to the annular space surrounding element 5 and thence upwardly over the gages and out through a discharge pipe 18. This coolant may be continuously circulated by a pump (not shown) and its temperature maintained at a uniform value by any suitable and well-known radiator control means. The lead wires for the gages extend through an opening 19 in plug 1 to be suitably sealed by a plug 20. In this manner it is seen that regardless of how high the temperature of the fluid may be acting against diaphragm 4 the gages can readily be maintained at a safe temperature by the coolant and without in any way interfering with the sensitivity and accuracy of the strain sensitive element regardless of the frequency changes in the pressure being measured. The electrical circuit, in which the axially extending strain sensitive gages 12 and 13 and the transversely extending compensating gages 14 and 15, are employed, is a usual Wheatstone bridge having an adjustable resistor 22 and condenser 23 connected to an amplifier 24 and any suitable indicating element 25 such as an oscillograph or meter for indicating the extent of unbalance of the bridge induced by either static or dynamic strains in element 4 proportional to the fluid pressure acting on the diaphragm 4.

Figure 3:
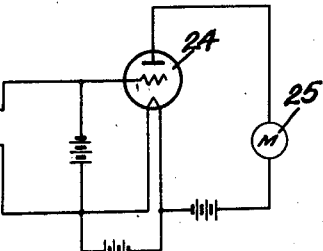
Fig. 3 is a modified form of fluid pressure measuring means embodying certain fundamental principles of my invention.
Figure 3:
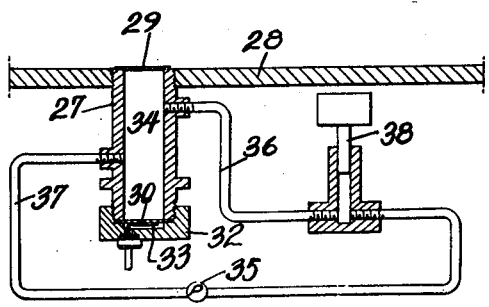

In the modification shown in Fig. 3 a hollow plug 27, threaded into the wall 28 of a fluid pressure vessel, has its opposite ends tightly closed by diaphragms 29 and 30, the upper one 29 being suitably welded, soldered or otherwise secured to the plug 27 while the lower one 30 is preferably held by a threaded cap 32 which clamps the diaphragm in position. The external surface of diaphragm 30 (lowermost surface) has strain gages 33 mounted thereon preferably of the same type shown in Fig. 1. The diaphragms thus form a closed chamber 34 through which a suitable coolant, preferably liquid, is circulated by a pump 35, an inlet pipe 36 and outlet pipe 37. The fluid pressure to be measured is transferred from diaphragm 29 to the fluid within chamber 34 to diaphragm 30 whereupon the strain gages 33 will measure deflection of the diaphragm in accordance with pressure fluctuations transmitted thereto. However, in order to transmit the pressure fluctuations it is necessary to establish and maintain a normal base pressure on the coolant circulated through chamber 34. This pressure is established by a constant load maintaining weighted plunger 38. The weight of plunger 38 is of sufficient magnitude so that its inertia allows pressure fluctuations to be superimposed upon the base pressure in chamber 34. Hence, it is possible to circulate a coolant through the pressure transmitting chamber 34 so that the coolant serves the dual function of cooling and of transmitting pressures to be measured as from diaphragm 29 to diaphragm 30. This arrangement has the advantage of eliminating the internal strain sensitive element 5, Fig. 1, although the Fig. 1 modification has certain other advantages such as more freedom in the operation of the coolant pumping system.

From the foregoing disclosure, it is seen that I have provided a relatively simple, compact and sturdy fluid pressure pickup which has a high degree of sensitivity, accuracy and stability.

It will of course be understood that various changes in details of construction and arrangement of parts may be made by those skilled in the art without departing from the spirit of the invention as set forth in the appended claims.

I claim:

1. A fluid pressure measuring device comprising, in combination, a movable member exposed to fluid pressure which is to be measured, a strain responsive element having one portion held against movement and another portion connected to said movable member whereby strains are induced in said responsive element in response to fluid pressures acting on said movable member, electrical strain gages connected to said strain responsive element so that the gages are responsive directly to the strains induced in the element itself and thereby act as an index of the fluid pressure to be measured, and means for imposing an initial preload on said strain responsive element to induce strains therein in addition to those induced by the fluid pressure.

2. The combination set forth in claim 1 further characterized by the provision of means for circulating a cooling medium over said gages to control the temperature thereof.

3. The combination set forth in claim 1 further characterized in that the preloading means includes a rotatable member, and means for preventing transmission of torsional forces from said rotatable member to the strain responsive element during preloading thereof.

4. A fluid pressure measuring device comprising, in combination, a plug-like member having an inner end adapted to be secured in the wall of a pressure vessel, said member having a bore extending from said inner end, a diaphragm secured to said inner end to close the end of the bore adjacent thereto whereby one side of the diaphragm is exposed to the fluid whose pressure is to be measured, a strain responsive element contacting said diaphragm on the other side thereof, means for supporting said responsive element substantially axially of said bore and in spaced relation to the wall thereof to provide an annular space, strain gages mounted on said strain responsive element within said annular space, and means for circulating a cooling medium through said annular space and over said gages to control the temperature thereof.

5. The combination set forth in claim 4 further characterized by the provision of means for imposing an initial compression load on said strain responsive element.

CHESTER H. GIBBONS.

REFERENCES CITED

The following references are of record in the file of this patent:

UNITED STATES PATENTS

| Number | Name | Date |
| --- | --- | --- |
| 995,841 | Brent | June 20, 1911 |
| 1,804,596 | Dickinson | May 12, 1931 |
| 2,360,886 | Osterberg | Oct. 24, 1944 |
| 2,363,181 | Howland | Nov. 21, 1944 |
| 2,398,372 | Green | Apr. 16, 1946 |
| 2,405,199 | Faust et al. | Aug. 6, 1946 |